(12) United States Patent
Meyer et al.

(10) Patent No.: US 6,654,832 B1
(45) Date of Patent: Nov. 25, 2003

(54) METHOD OF INITIALIZING A PROCESSOR AND COMPUTER SYSTEM

(75) Inventors: James W. Meyer, Shoreview, MN (US); Terry M. Cronin, Mounds View, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/493,441

(22) Filed: Jan. 18, 2000

(51) Int. Cl.[7] .............................. G06F 13/00; G06F 9/00
(52) U.S. Cl. .............................. 710/100; 710/10; 713/1; 713/2
(58) Field of Search .................. 710/10, 104, 100; 713/1, 2, 400, 100; 711/172

(56) References Cited

U.S. PATENT DOCUMENTS

| | | | |
|---|---|---|---|
| 4,405,980 A | 9/1983 | Hess | |
| 4,433,379 A | 2/1984 | Schenk et al. | |
| 5,287,476 A | 2/1994 | Keener et al. | 395/425 |
| 5,303,352 A * | 4/1994 | Robinson et al. | 710/104 |
| 5,835,960 A * | 11/1998 | Keene et al. | 711/172 |
| 5,842,012 A * | 11/1998 | Walker et al. | 713/2 |
| 5,884,094 A * | 3/1999 | Begun et al. | 710/10 |
| 5,961,643 A * | 10/1999 | Klein | 713/2 |
| 6,044,474 A * | 3/2000 | Klein | 713/400 |
| 6,108,719 A * | 8/2000 | Klein | 710/10 |
| 6,269,441 B1 * | 7/2001 | Lee et al. | 713/1 |
| 6,327,653 B1 * | 12/2001 | Lee | 713/100 |

* cited by examiner

*Primary Examiner*—Tim Vo
(74) *Attorney, Agent, or Firm*—Dorsey & Whitney LLP

(57) ABSTRACT

BIOS instructions are transferred from a BIOS ROM to a processor for either execution or storage in a system memory. The BIOS ROM has an address bus coupled to an address bus of the processor and a data bus coupled to the an intelligent drive electronics ("IDE") controller through the data bus portion of an IDE bus. In operation, the processor applies addresses directly to the address bus of the BIOS ROM, and the corresponding instructions are coupled through the IDE data bus and the system controller to the data bus of the processor.

16 Claims, 4 Drawing Sheets

METHOD OF INITIALIZING A PROCESSOR AND COMPUTER SYSTEM

TECHNICAL FIELD

The present invention relates to computer systems, and, more particularly, to a method of transferring data through a bus bridge in a manner that reduces the number of external terminals of the bus bridge.

BACKGROUND OF THE INVENTION

When a computer system is powered on or reset, computer instructions are executed that are part of a basic input/output system ("BIOS") program. The BIOS program is normally in the form of firmware routines stored in a read only memory ("ROM"), which may or may not be a programmable read only memory ("PROM"). The processor may execute the BIOS program directly from the BIOS ROM. However, the BIOS program is usually transferred from the BIOS ROM to system memory, such as dynamic random access memory ("DRAM"), in a process known as "BIOS shadowing." Following transfer of the BIOS program to system memory, the processor is initialized and then executes initialization routines, or bootstrap routines, that are part of the BIOS program from the system memory. This entire process, including any shadowing of the firmware routines from the ROM to the system memory, is known as "booting" the computer system If the processor executes the BIOS program directly from the BIOS ROM, it must repeatedly apply an address to the ROM and then couple an instruction to the processor that is stored at the address in the ROM. If the BIOS program is shadowed, the processor repeatedly fetches and executes instructions for transferring the BIOS program from the BIOS ROM, as well as the BIOS program itself, in a multi-step process. In either case, the BIOS program instructions are transferred over a relatively low-speed bus through a bus bridge to a processor bus that is connected to the processor.

A variety of configurations may be used in a computer system to couple a BIOS ROM to a processor. Examples of such systems are illustrated in FIGS. 1 and 2. With reference to FIG. 1, a computer system 10 includes a processor 14, such as an Intel® Pentium® processor or Pentium II® processor, although other processor may, of course, be used. For example, the processor 14 may be any microprocessor, digital signal processor, micro controller, etc. The processor 14 is coupled to a processor bus 16 which includes data, control, and address buses (not shown) that provide a communication path between the processor 14 and other devices, as explained below. One device with which the processor 14 communicates is a cache memory device 18, typically cache static random access memory ("SRAM"), which is also coupled to the processor bus 16. As is well known in the art, the cache memory device 18 is generally used for the high speed storage of instructions that are frequently executed by the processor 14, as well as for data that are frequently used by the processor 14.

Also coupled to the processor bus 16 is a system controller 20. The system controller 20 performs two basic functions. First, the system controller 20 interfaces the processor 14 with a system memory 22, which is generally a dynamic random access memory ("DRAM"). More specifically, the system memory 22 may be an asynchronous DRAM, a synchronous DRAM ("SDRAM"), a video or graphics DRAM, a packetized DRAM, such as a synchronous link DRAM ("SLDRAM"), or any other memory device. The system controller 20 includes a DRAM controller 24, which interfaces the processor 14 to the system memory 24 to allow the processor 14 to write data to and read data from the system memory 22. Basically, the system controller 20 performs this function by receiving and sending data to the processor 14 (although the data may bypass the system controller 20 by being coupled directly to the processor bus 16), receives addresses from the processor 14, and receives high level command and control signals from the processor 14. In response, the system controller 20 couples the data to and from the system memory 22 via a data bus 32, generates separate row and column addresses and sequentially applies them to the memory device via an internal address bus 34, and generates and applies to the system memory 22 lower level command signals via a control bus 36.

The second function performed by the system controller 20 is to interface the processor bus 16 to a peripheral I/O bus, such as a Peripheral Component Interconnect ("PCI") bus 40. The PCI bus 40, in turn, is coupled to a conventional PCI-ISA bus bridge 42 and a conventional VGA controller 44 driving a conventional display 46. The PCI bus 40 may also be connected to other peripheral devices (not shown) in a manner well known to one skilled in the art. The PCI-ISA bus bridge 42 may also include a disk drive controller, such as an Intelligent Drive Electronics ("IDE") controller 48, which controls the operation of an IDE disk drive 50 in a conventional manner.

The PCI bus 40 is a relatively high speed peripheral I/O bus. Many peripheral devices are adapted to interface with a relatively slow speed peripheral I/O bus, known as an industry standard architecture ("ISA") bus. The computer system 10 illustrated in FIG. 1 includes an ISA bus 60 that may be coupled to such I/O devices as a Keyboard Controller, Real Time Clock, and Serial and Parallel Ports, all of which are collectively designated by reference number 62. The ISA bus 60 may also be coupled to a BIOS ROM 64 as well as other I/O devices (not shown) as is well known in the art. The BIOS ROM 64 stores the BIOS program, which, as explained above, is executed by the processor 14 at boot-up, either directly or after being transferred to the system memory 22 if the BIOS is shadowed.

Although the BIOS ROM 64 is shown in the computer system 10 of FIG. 1 coupled to the ISA bus 60, it will be understood that it has conventionally been coupled to other components or buses, including the PCI bus 40, the IDE controller 48 within the PCI-ISA bridge 42, and a controller within the system controller 20. For example, an alternative example of a conventional computer system 70 shown in FIG. 2 includes many of the same components used in the computer system 10 of FIG. 1. Therefore, in the interest of brevity, an explanation of their structure and operation will not the repeated. The system 70 uses a system controller 80 that includes not only a DRAM controller 82 and a PCI bus controller 84, but also an accelerated graphics processor ("AGP") controller 86 and an IDE controller 88. The computer system 70 shown in FIG. 2 thus reflects the trend in computer architecture to couple as many components as possible to the system controller 80. The AGP controller 86 is coupled to an accelerated graphics processor 90 which is, in turn, coupled to a display 94. The IDE controller 88 is coupled through an IDE data bus 96 and an IDE control bus 98 (sometimes known as PC AT Attached ("ATA") buses) to a BIOS ROM 100 as well as to a pair of IDE devices 102, 104, such as disk drives. Not shown in FIG. 2, as will be apparent to one skilled in the art, is circuitry for multiplexing the data bus 96 between an address bus port of the BIOS ROM 100 and a data bus port of the BIOS ROM 100 since the IDE, or ATA, bus does not include an extensive address bus. Instead, the IDE bus includes only 4 address bits.

In operation, the system controller 80 is used to interface the processor with all of the other components of the computer system 70 except the cache memory device 18, i.e., the system memory 22, the PCI bus 40, the accelerated graphics processor 90, and the BIOS ROM 100 and IDE devices 102, 104. When a BIOS instruction is to be transferred, the IDE controller 88 outputs the address of the instruction's storage location on the IDE data bus 96, and the BIOS ROM then outputs the instruction which is coupled to the IDE controller 88 through the IDE data bus 96.

One problem with the computer system 10 illustrated in FIG. 1, and particularly the computer system 70 illustrated in FIG. 2, is a proliferation of external terminals that the system controllers 20, 80 and the PCI-ISA bridge 42 must have to interface with all of the components to which they are connected. Increasing the number of terminals on an integrated circuit, such as a bus bridge, increases the cost of packaging the integrated circuit, increases the size of the integrated circuit package, increases the cost and complexity of mounting the integrated circuit on a circuit board, and increases the likelihood all of a faulty interconnection. It is therefore desirable to minimize the number of external terminals on an integrated circuit, such as a bus bridge. Although this problem exists to some degree with many integrated circuits in a computer system, it is particularly serious for system controllers and bus bridges since they generally have more external terminals than other integrated circuits in computer systems.

The problems resulting from the proliferation of external terminals are exacerbated by two trends in computer system architecture. First, the sizes of data buses continue to increase to support the faster transfer of data, and the sizes of address buses continue to increase to allow addressing larger capacity system memories. As the size of these buses have increased, the number of terminals that the system controller or bus bridge must have to interface with these buses had correspondingly increased. For example, data buses have grown from 16 data bits, to 32 data bits to currently 64 data bits. Even larger data buses can be expected in the future. Second, as mentioned above, there has been a tendency to relocate the interface with peripheral devices closer to the processor to decrease the time required to access the peripheral devices. This trend is illustrated by comparing the computer system 10 of FIG. 1 with the computer system 70 of FIG. 2. However, as this trend continues, the system controller must interface with additional buses, as also exemplified by the computer system 70 of FIG. 2. Both of these trends have increased the number of external terminals that the system controller must include and, and as a result, have increased the resulting problems.

There is therefore a need to reduce the number of external terminals on the system controllers of computer systems despite industry trends tending to increase the number of such external terminals.

SUMMARY OF THE INVENTION

An inventive method couples data from an addressable device to a processor in a computer system. For example, initialization instructions may be coupled from a memory device to a processor. In accordance with the method, an address is output from the processor and coupled directly to the addressable device. Data, such as an initialization instruction, is then output from the addressable device, and the data is coupled to the processor through a system controller.

DETAILED DESCRIPTION OF THE INVENTION

Figure 1:
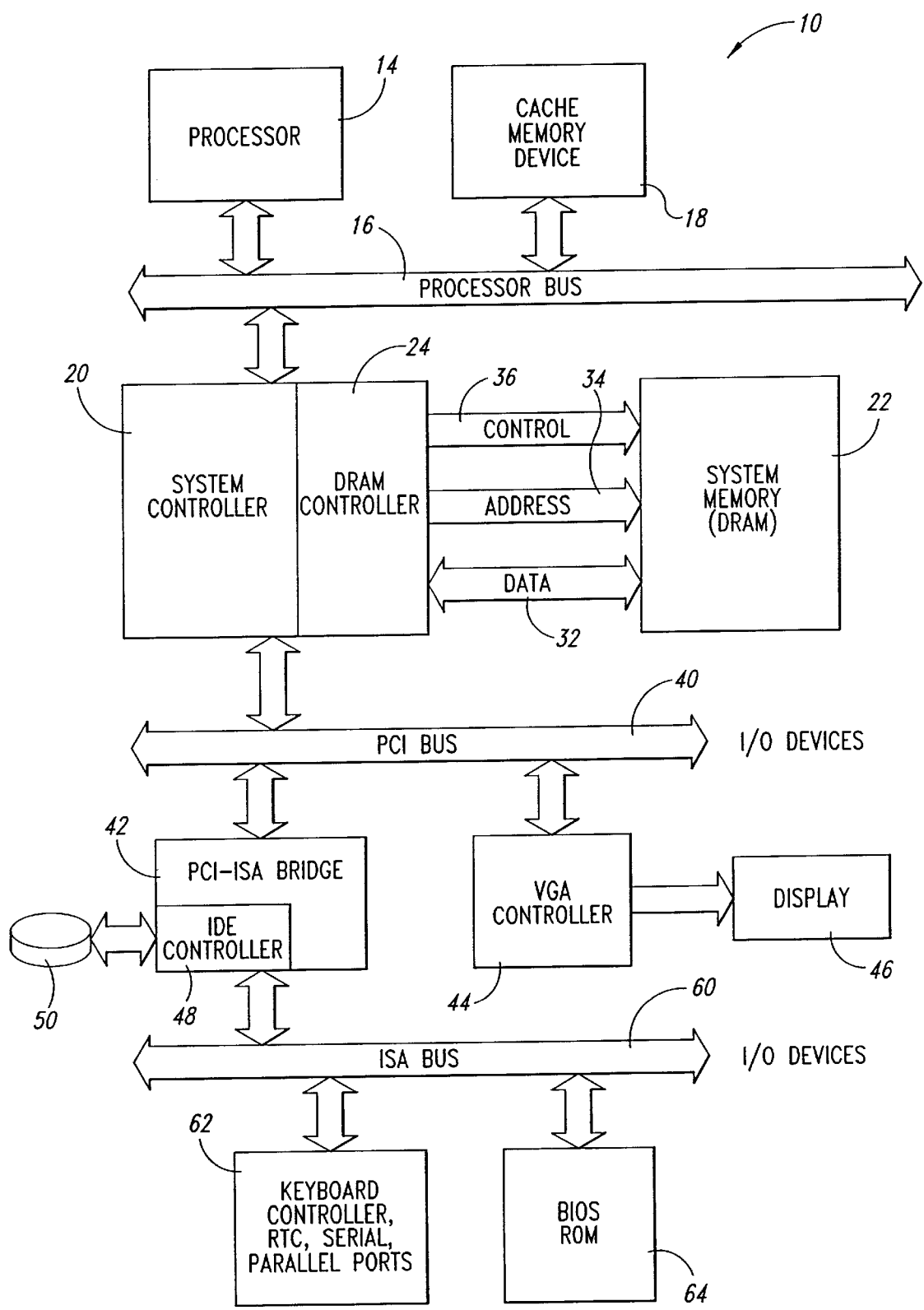
FIG. 1 is a block diagram of a conventional computer system in which a BIOS ROM is coupled to a processor through two I/O buses, a bus bridge, and a system controller.
Figure 2:
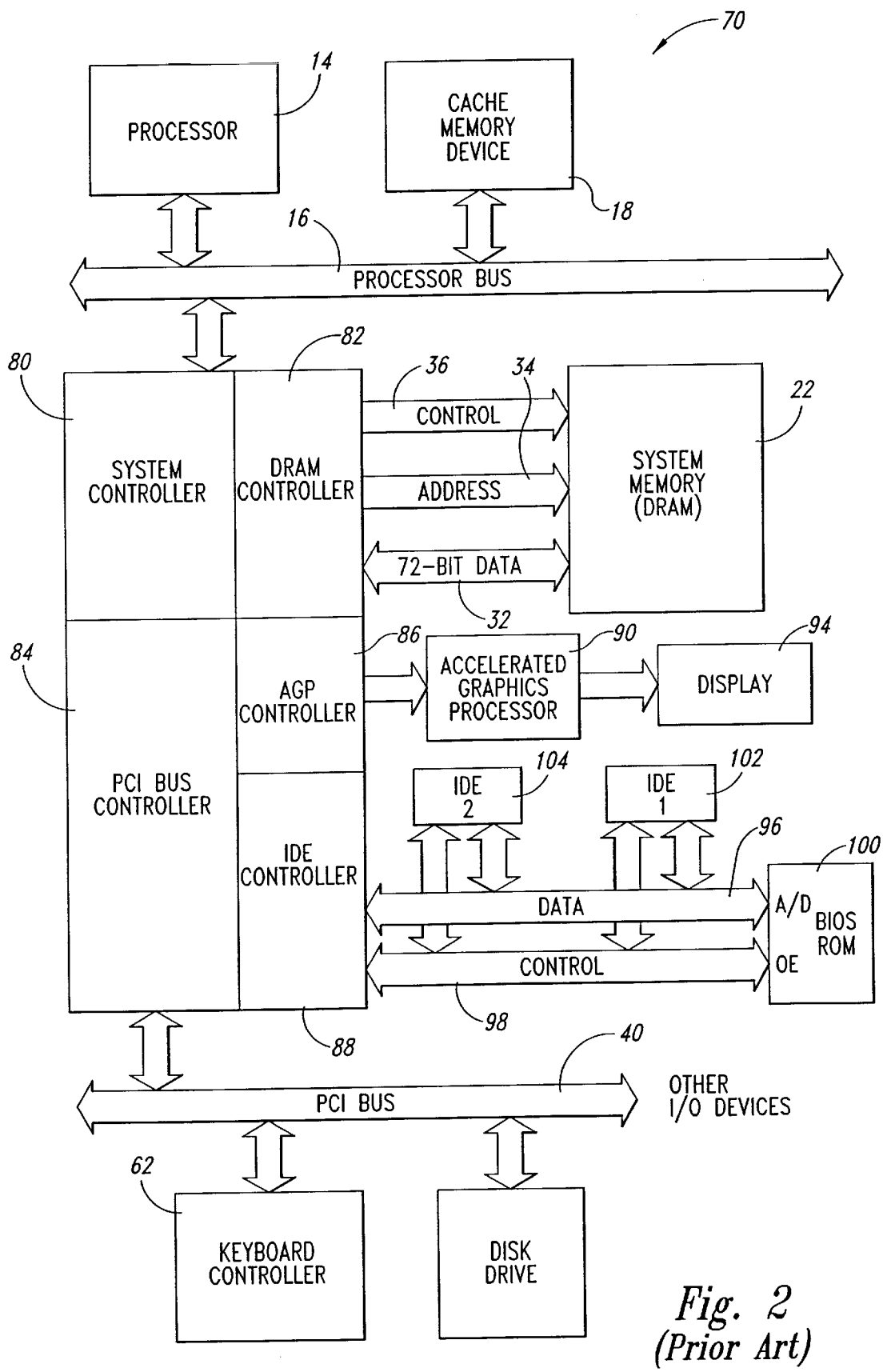
FIG. 2 is a block diagram of a conventional computer system having a more modem architecture in which a BIOS ROM is coupled to a processor through a system controller.
Figure 3:
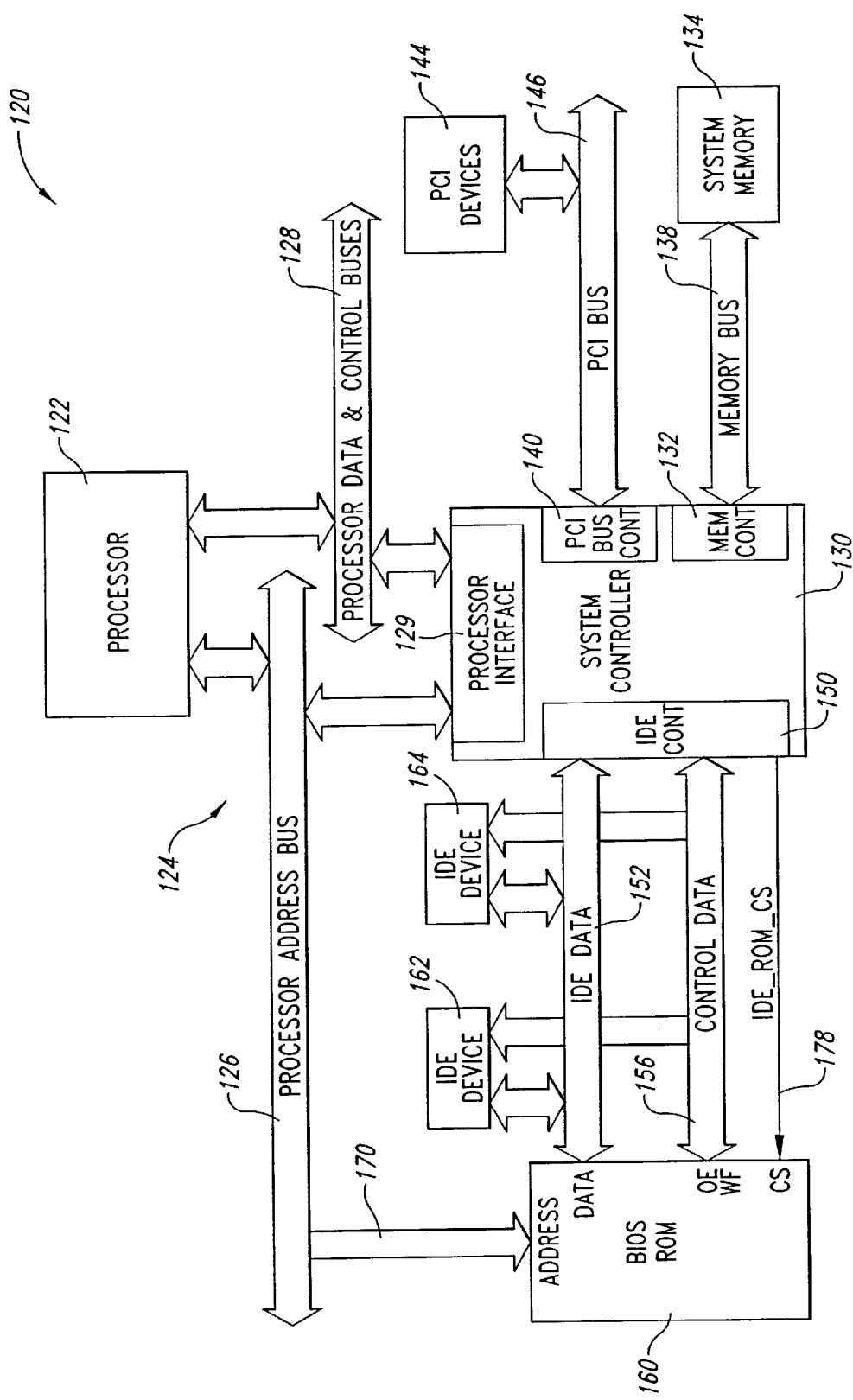
FIG. 3 is a block diagram of a computer system in accordance with one embodiment of the invention.

A computer system 120 in accordance with one embodiment of the invention is illustrated in FIG. 3. The computer system 120 includes a processor 122 of conventional design, such as a Pentium® or Pentium II® microprocessor. The processor 122 is coupled to a processor bus 124, which includes a processor address bus 126 and processor data and control buses 128. The processor address bus 126 and the processor data and control buses 128 are coupled to a processor interface 129 in a system controller 130. The system controller includes a system memory controller 132 that is coupled to a system memory 134 through a system memory bus 138. The system controller 130 also includes a PCI bus controller 140 that is coupled to various PCI devices 144 through a PCI bus 146. Finally, the system controller 130 includes and IDE controller 150 that is coupled to an IDE data bus 152 and an IDE control bus 156. Coupled to the buses 152, 156 are a BIOS ROM 160 and first and second IDE devices 162, 164. In contrast to conventional practice exemplified by the computer system 70 of FIG. 2, an address of the BIOS ROM 160 is not coupled to the IDE controller 150 and applied to the BIOS ROM 160 through the IDE data bus 152. Instead, the processor address bus 126 is coupled to the address bus port of the BIOS ROM 160 through a separate ROM address bus 170. The BIOS ROM 160 is selectively enabled by a chip select ("CS") signal applied to the BIOS ROM 160 from the IDE controller 150 through line 178.

In operation, the processor 122 writes data to and reads data from the system memory 134 in a conventional manner through the system memory controller 132 in the system controller 130 and through the memory bus 138. Similarly, the processor 122 interfaces with I/O devices, such as the PCI device 144, in a conventional manner through the PCI controller 140 in the system controller 130 and through the PCI bus 146. Finally, the processor 122 interfaces with the IDE devices 162, 164 in a conventional manner through the IDE controller 150 in the system controller 130 and the IDE data bus 152 and the IDE control bus 156. What is not conventional is the manner in which the processor 122 interfaces with the BIOS ROM 160. The processor 120 reads instructions from the BIOS ROM 160 by first applying the address where the instruction is stored to the ROM 160 through the processor address bus 126 and ROM address bus 170. When enabled by a chip select signal coupled through the line 178, the instruction is coupled from the BIOS ROM 160 to the processor 122 through the IDE data bus 152, the IDE controller 150, the processor interface 129 and the processor data bus 128.

One advantage of the computer system 120 of FIG. 3 is that the system controller 130 need not include the large number of external terminals that would be required to couple the address bus of the BIOS ROM 160 to the system controller 130. Furthermore, circuitry for multiplexing the IDE data bus 152 to the data bus port and the address bus port of the BIOS ROM 160 is not required.

Figure 4:
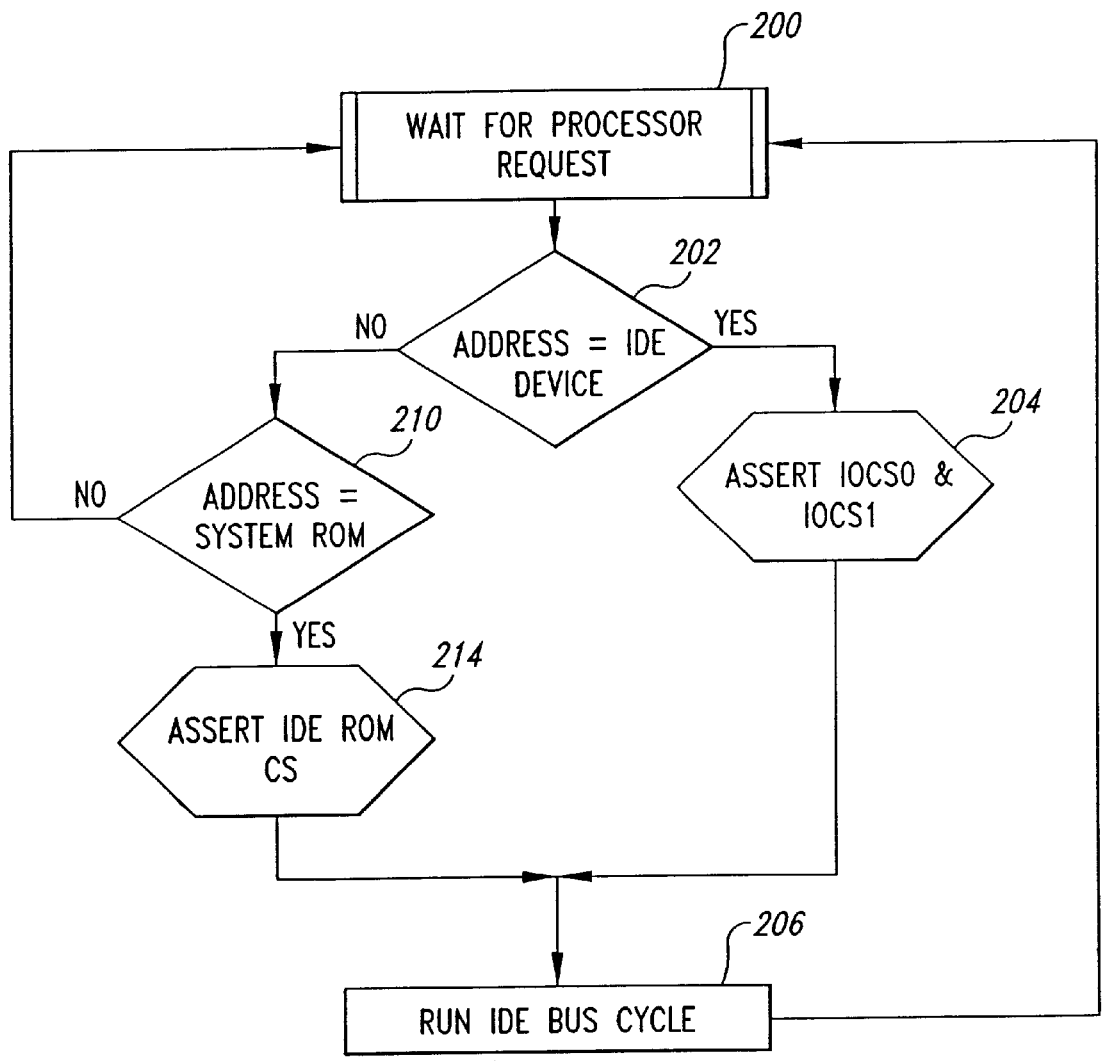
FIG. 4 is a flow chart showing the initialization operation of the computer system of FIG. 3.

The operation of the computer system 120 of FIG. 3 during initialization is illustrated in FIG. 4. The IDE controller 150 (FIG. 3) waits at for an address from the processor 122 at 200. When an address is received from the processor 122, a determination is made at 202 whether the received address is in the address space of either the IDE device 162 or the IDE device 164. If so, a chip select ("CS") signal for the appropriate IDE device 162, 164 is asserted at 204, and the IDE bus cycle is run at 206.

If a determination is made at 202 that the received address is not in the address space of either the IDE device 162 or the IDE device 164, then a check is made at 210 to determine if the address is in the address space of the BIOS ROM 160. If not, the method returns to 200 to wait for another address from the processor. If a determination is made at 210 that the address is in the address space of the BIOS ROM 160, the IDE controller 150 applies a chip select signal to the BIOS ROM 160 at 214. The IDE bus cycle is then run at 206 to transfer the instruction from the BIOS ROM 160 to the processor 122. The above sequence is repeated each time that instruction is transfer from the BIOS ROM 160 to the processor 122.

It will be appreciated that, although a specific embodiment of the invention has been described for purposes of illustration, various modifications may be made without deviating from the spirit and scope of the invention. Those skilled in the art will appreciate that many of the advantages associated with these circuits and processes described above may be provided by other circuit configurations and processes. For example, although the BIOS ROM 160 has been described in FIG. 3 as being coupled to an IDE bus, it will be understood that the principles exemplified by this architecture exist for other bus systems, such as a PCI bus, in addition to IDE and Enhanced IDE ("EIDE") bus systems. Further, although the system 120 shown in FIG. 3 includes a BIOS ROM coupled to the processor in accordance with one embodiment of the invention, it will be understood that ROMs containing other information or other components addressable by the processor may be coupled to the processor in the same or similar manners. Also, although the BIOS ROM is shown with its address bus coupled directly to the address bus of the processor and its data bus coupled to the data bus of the processor through the system controller, it will by understood that the data bus of the BIOS ROM or other device may be coupled directly to the data bus of the processor and the address bus or other buses of the BIOS ROM or other device may be coupled to the processor through a system controller or other device. Finally, although the BIOS ROM is shown as being coupled to a system controller that is coupled to the processor bus, it will be understood that it may be coupled to other bus bridge devices in the same or a similar manner, or even to bus bridge devices, such as a PCI/ISA bus bridge, that are coupled to the processor through a system controller or other bus bridge. Accordingly, the invention is not limited by the particular disclosure above, but instead the scope of the invention is determined by the following claims.

We claim:

1. A method of initializing a processor with initialization instructions stored in a memory device, the method comprising:

outputting an address from the processor;

coupling the address directly to the memory device;

outputting an instruction from the memory device in response to receiving the address; and coupling the instruction to the processor through a system controller.

2. The method of claim 1 wherein the act of coupling the instruction to the processor through a system controller comprises:

resetting the processor;

coupling the instruction from the memory device to the system controller through an I/O bus;

receiving the instruction at the system controller at an I/O controller, and transmitting the instruction from the system controller to the processor through a processor interface.

3. The method of claim 1 wherein the memory device comprises a read only memory ("ROM").

4. The method of claim 1 wherein the instructions stored in the memory device comprises BIOS instructions.

5. The method of claim 2 wherein the act of coupling the instruction from the memory device to the system controller comprises coupling the instruction from the memory device through an intelligent drive electronics ("IDE") bus.

6. The method of claim 2 wherein the act of receiving the instruction at an I/O controller comprises receiving the instruction at intelligent drive electronics ("IDE") controller.

7. The method of claim 3 wherein the instructions stored in the ROM comprises BIOS instructions.

8. The method of claim 5 further comprising coupling an IDE device to the processor through the IDE bus.

9. In a computer system having a processor and a system memory coupled to the processor through a system controller, a method of coupling data from an addressable device to the processor, comprising:

coupling an address from the processor directly to the addressable device;

outputting data from the addressable device in response to receiving the address;

coupling the data to the system controller through an I/O bus; and, coupling the data to the processor through the system controller.

10. The method of claim 9 wherein the act of coupling the data to the system controller through the I/O bus comprises coupling the data to the system controller through an intelligent drive electronics ("IDE") bus.

11. The method of claim 9 wherein the act of coupling the data to the processor through the system controller comprises coupling the data to the processor through an intelligent drive electronics ("IDE") controller.

12. The method of claim 9 wherein the act of outputting data from the addressable device comprising outputting BIOS instructions.

13. The method of claim 9 wherein the addressable device comprises a memory device.

14. A method of initializing a processor with basic input/output ("BIOS") instructions stored in a read only memory ("ROM") having an address bus and a data bus, the processor having a data bus and an address bus, the method comprising:

outputting an address from the processor on the address bus of the processor;

coupling the address directly to the address bus of the memory device;

outputting a BIOS instruction from the memory device in response to receiving the address;

coupling the BIOS instruction to a system controller thorough an I/O bus; and coupling the BIOS instruction through the system controller to the data bus of the processor.

15. The method of claim 14 wherein the act of coupling the BIOS instruction to a system controller thorough an I/O bus comprises coupling the BIOS instruction thorough an intelligent drive electronics ("IDE") bus.

16. The method of claim 14 wherein the act of coupling the BIOS instruction through the system controller comprises coupling the BIOS instruction from the I/O bus through an intelligent drive electronics ("IDE") controller, and coupling the BIOS instruction through a processor interface to the data bus of the processor.

* * * * *